(12) United States Patent
Zagaroff

(10) Patent No.: US 6,857,679 B2
(45) Date of Patent: Feb. 22, 2005

(54) METHOD AND APPARATUS FOR ASSISTING IN THE LOWERING AND RAISING OF A TAILGATE

(76) Inventor: Dimiter S. Zagaroff, 2 Forester Rd., Lincoln, MA (US) 01773

( * ) Notice: Subject to any disclaimer, the term of this patent is extended or adjusted under 35 U.S.C. 154(b) by 0 days.

(21) Appl. No.: 10/417,414

(22) Filed: Apr. 15, 2003

(65) Prior Publication Data

US 2004/0026950 A1 Feb. 12, 2004

Related U.S. Application Data

(63) Continuation-in-part of application No. 10/121,747, filed on Apr. 12, 2002.
(60) Provisional application No. 60/290,817, filed on May 14, 2001.

(51) Int. Cl.[7] .............................................. B62D 33/03
(52) U.S. Cl. ...................... 296/57.1; 296/53; 160/191; 160/215
(58) Field of Search ........................... 296/57.1, 50, 53, 296/55, 76, 146.8, 52; 160/191, 192, 215

(56) References Cited

U.S. PATENT DOCUMENTS

| | | | |
|---|---|---|---|
| 2,796,287 A | * 6/1957 | Moyes | ...................... 296/57.1 |
| 4,143,904 A | * 3/1979 | Cooper et al. | ............. 296/57.1 |
| 4,585,265 A | 4/1986 | Mader | |
| 5,234,249 A | 8/1993 | Dorrell | |
| 5,358,301 A | * 10/1994 | Konchan et al. | ......... 296/146.1 |
| 5,645,310 A | 7/1997 | McLaughlin | |
| 5,810,339 A | * 9/1998 | Kuspert et al. | ............. 267/293 |
| 5,954,383 A | * 9/1999 | Beck et al. | .................... 296/50 |
| 5,988,724 A | 11/1999 | Wolda | |
| 6,196,609 B1 | * 3/2001 | Bowers | ...................... 296/57.1 |
| 6,217,097 B1 | * 4/2001 | Rogers, Jr. et al. | ......... 296/57.1 |
| 6,357,813 B1 | * 3/2002 | Vandeberghe et al. | ..... 296/57.1 |
| 6,450,559 B1 | * 9/2002 | Renke | ........................ 296/57.1 |

* cited by examiner

Primary Examiner—Lori L. Coletta
(74) Attorney, Agent, or Firm—Hamilton, Brook, Smith & Reynolds, P.C.

(57) ABSTRACT

An apparatus for assisting in the one-handed safe raising and lowering off a tailgate pivotally attached to a bed of a truck. The apparatus having a module which is positioned to be hidden when the tailgate is in an up position. The module having a spring attached to the tailgate and a side of the bed of the truck for providing a counterbalancing force operating against the weight of the tailgate. The tailgate counterbalance employs lost motion and pretension of a torsion bar to achieve both a safety stop position that arrests the tailgate at about 15 degrees as well as reducing the effort required to lift and lower the tailgate beyond that point.

29 Claims, 14 Drawing Sheets

METHOD AND APPARATUS FOR ASSISTING IN THE LOWERING AND RAISING OF A TAILGATE

RELATED APPLICATIONS

This application is a continuation-in-part of U.S. application Ser. No. 10/121,747, filed Apr. 12, 2002, which claims benefit of U.S. Provisional Application No. 60/290,817, filed May 14, 2001.

The entire teachings of the above applications are incorporated herein by reference.

FIELD OF INVENTION

This invention relates the controlled opening and closing of tailgates and more particularly to a compact counterbalancing module for controlling the opening and closing of the tailgate.

BACKGROUND

As will be appreciated, tailgates for pickup trucks typically range in weight from 40 to 70 pounds and are hinged at the rear of the truck bed such that when the tailgate is unlocked by the pulling of a lever or handle, the tailgate opens to a point level with the truck bed where it is restrained usually by detachable folding straps. Typically, the tailgates can be removed from the truck body when the tailgate is pivoted to a partially open tailgate removal position.

The weight of the tailgate precludes one handed operation for any but the strongest individual. People of normal build have to use their second hand, or shoulder or knee to support the tailgate in an effort to kept it from dropping too quickly.

The single-handed supporting of the tailgate often times can result in wrist injury as the weight of the tailgate overpowers the ability of the individual to control its descent and it comes crashing down in an uncontrolled fashion. Normally a person drops the gate or sometimes raises his or her knee in order to arrest the fall of the tailgate.

The raising of one's knee to prevent the tailgate from dropping has reportedly resulted in crushed knee caps or other damage to the knee, whereas supporting the relatively heavy tailgate through one handed operation has resulted in sprained wrists due to the inability of the individual to hold the heavy tailgate with one hand.

It will be appreciated that a free falling tailgate can, in fact, crush anything that is underneath it and can, for instance, hurt children who are standing at the back of the tailgate when it falls. Moreover, it is hard to close a heavy tailgate.

Note that pickup trucks and vehicles with tailgates are now more popular in suburban settings in which the tailgate is to be lowered, for instance, to load groceries into the back of the pickup. Pickups are also utilized routinely in camping and the provision of camper tops for the pickups has increased their popularity for carrying lighter loads than a pickup is normally designed to carry. This popularity has resulted in the use of these trucks by non-professionals such as family members and indeed anybody associated with the family. Thus, it is important that the tailgate be counterbalanced in such a way that it not cause damage to one trying to lower it and must afford the ability to close the tailgate in a single handed operation easily even by a small person, yet permit rapid removal of the tailgate and the counterbalance mechanism from the truck body.

In the past, tailgates have been counterbalanced by internal torsion bars which are factory installed such as illustrated by U.S. Pat. No. 5,358,301. Since these counterbalancing mechanisms are only installed in a limited number of vehicles, there is a necessity for providing an after-market device to be able to counterbalance the tailgate.

As illustrated by U.S. Pat. No. 5,988,724, issued to Tiete O. Wolda, a torsion bar or torquing device called a torque rod is utilized in the tailgate hinge mechanism such that the tailgate has a torque rod which assists in the opening or closing of the tailgate. While the Wolda patent indicates that his device is suitable for after-market installation, it requires the removal of the hinge bracket, which previously was bolted to the truck's tailgate. However, presently, the hinge brackets are often spot welded to the tailgate, making after-market utilization impossible.

In an effort to address the after-market, there are those who have tried to use coil springs to counterbalance tailgates. However, coil springs are much too cumbersome and unsightly to be attached to tailgates. One such attempt to use coil springs is illustrated by U.S. Pat. No. 5,954,383, in which a spring-loaded pulley arrangement along with a tether is utilized to assist in the lowering and raising of a tailgate. However, such a lift kit involves the mounting of a channel that houses the pulleys and a sizable spring which obstructs the loading area and is so big that it is difficult to merchandise, for instance on a rack display. Moreover, the device is cumbersome to install and is unsightly.

There is thus a need for an extremely compact easy to attach a counterbalance device that can be hidden from view and yet has the strength to provide the required counterbalance force.

By way of further background, there are a number of devices, which limit the positions of a tailgate, one of which is shown in U.S. Pat. No. 4,585,265. However, there is no counterbalancing action in such a positioning device.

Additionally, there are a number of devices, which are utilized to reduce the aerodynamic drag caused by a tailgate by partially opening it. One such device is illustrated in U.S. Pat. No. 5,645,310, in which a strap keeps the tailgate at a predetermined angle so as to minimize the aerodynamic load. Note that in this device there is no spring loading or any attempt to counterbalance the tailgate.

A further air drag reducing tailgate device is shown in U.S. Pat. No. 5,234,249 issued to Jay I. Durrell in which the tailgate is positioned responsive to the force of the wind or air pressure on the tailgate panel. This is done through the utilization of a dashpot type device in which a conventional door closure device is utilized to position the tailgate.

It will be appreciated in the above-mentioned patent that there is no attempt to counterbalance the tailgate during opening or, in fact, facilitate opening and closing of the tailgate. In this patent the spring tension is set to be responsive not to the weight of the tailgate but rather to the aerodynamic pressure on the tailgate which pressure exceeds counterbalancing forces. The reason is that not only must the weight of the tailgate be accommodated through the tensioning mechanism; it must counteract the force on the tailgate presented as a cross-section to the wind.

Wind pressures on a tailgate of 60"×20" at 75 miles an hour exceed 150 pounds. On the other hand, the tailgate itself weighs, for instance, 50 pounds so that the tension set by the Durrell device would have to be three times that necessary for counterbalancing. The result is that with this device installed it would be virtually impossible to open the tailgate at all. As a result, the Durrell device must be disconnected in order to lower the tailgate. To this end, Durrell describes that its links can be quickly disassembled so that the tailgate can be lowered for loading of the truck. In short, although the Durrell reference utilizes a door closure apparatus for providing that the tailgate be partially opened in the presence of wind loading it does not aid in lowering and raising the tailgate to load or unload the truck.

SUMMARY OF THE INVENTION

In contradistinction to the above noted systems for controlling the lowering and raising of a tailgate, in the subject system a compact easily hidden and easily installed accessory provides a counterbalancing force for the tailgate that does not interfere with removal of the tailgate. The counterbalance force is set to be less than the weight of the tailgate at its lowest point so that once lowered, the tailgate remains down.

In one embodiment the counterbalance force is provided by a specially constructed spiral wound spring which although compact and hide able provides an unusual amount of counterbalance force. The spring is contained within an easily mounted module in a compartment to either side of the tailgate, between the tailgate and the sides of the truck bed. Although in spiral wound form, the spring pressure is sufficient to permit the counterbalancing of at least a portion of the weight of the tailgate. The spring permits controlled lowering of the tailgate at a safe rate as well as assisting lifting the tailgate by smaller, weak individuals, with the spring permitting a one-handed operation.

The spring in one embodiment is a 2" diameter coil made of 4½ wraps of 0.098" thick×0.500" wide Type 1095 Carbon Steel which although compact provides 35 foot pounds of torque. The use of the spiral wound spring makes possible a small module that can be tucked away between the tailgate and the side of the truck bed where it is out of sight and unobtrusive.

In another embodiment, a concealed gas spring is used which when the tailgate is up is hidden between the tailgate and the truck bed side. The gas spring is set up so as to provide a counterbalancing force that is insufficient to raise a lowered tailgate when fully lowered. The use of the gas spring has an additional advantage. Because of the damping action associated with the gas spring, its use for controlling tailgates means that even with handsoff, the tailgate will descend slowly. Thus once the tailgate is unlocked, even unattended, the tailgate will not come crashing down. Moreover, the top of the gas spring is offset for clearance for the usual safety strap that keeps the tailgate level when lowered. As an added advantage, concealment of the gas spring when the tailgate is up prevents contamination from loads hauled by the truck and general road debris.

The subject module is designed as an after-market package and can be bolted into place quite easily by non-professionals without drilling using the existing attachment bolts provided for the detachable folding straps and/or the tailgate hinge bracket on the tailgate side and the existing quick connect bolt on the truck side. The tailgate and the subject module can be easily lifted off the truck body without the use of tools by simply unclipping the detachable folding straps and the subject module from the quick connect bolts on the truck side. Its use is therefore attractive to suburban family members and non-professionals who are utilizing the pickup truck not only to haul light loads but also as a convenient family vehicle.

The subject system thus permits the lowering of the tailgate in a single handed operation due to the fact that the majority of the weight of the tailgate is counterbalanced by the restoring force of the spring. This precludes the necessity of utilizing either a person's other hand to hold the tailgate or another portion of the person's body.

Since tailgates are usually exposed to dust and dirt as well as mud and other grime, single-handed operation is useful so as to not soil one's clothes when operating the tailgate. Additionally, the single-handed operation of the tailgate made possible through the subject invention eliminates the problem of strain on wrist ligaments and spraining of one's wrist when unlocking the tailgate. Due to the tendency of one to use one's knee to prevent the tailgate from falling, injury to one's kneecap is avoided when using the subject invention.

Finally, injury to small children standing under the tailgate is eliminated due to the controlled lowering of the tailgate through the single-handed operation described above.

In another embodiment, a lost motion device is employed so that the tailgate can be cracked open freely; but is then maintained in a safe slightly open position by the use of a lost motion linkage in combination with a sufficient degree of pretension of the counterbalancing spring. One reason for the need for the lost motion device is that often the tailgate handle gets stuck due to road debris, mud or other contaminants which cause the tailgate handle to jam. In the process of pulling at the handle to free it, sometimes the tailgate is released suddenly and comes crashing down. The lost motion device permits an individual to yank at the handle to get it unstuck and yet keep the tailgate up until it is desired to lower it. In short, the lost motion device prevents free fall crash and provides a safety stop position no matter how the tailgate is opened.

The subject accessory thus provides safety to protect wrists, knees and small children. Its ease of use permits one-handed operation. The module is unobtrusive and does not protrude into the bed of the truck. Because of its design it promotes simple aftermarket installation with no drilling required and permits tailgate removal without the need to demount the module or use tools. Moreover when a lost motion linkage is employed it takes the worry out of opening the tailgate and any possible crash. Once the tailgate handle is lifted, the tailgate opens only partially and stays there even if the handle is let go. Thereafter the individual is free to lower the tailgate in a counterbalanced controlled fashion.

In summary, a compact one-handed tailgate accessory for assisting in the safe raising and lowering of tailgates includes a module tucked in-between the tailgate and the truck bed sides in a pocket so as to be hidden from view, in one embodiment having a spring loaded linkage which counterbalances the tailgate so that raising and lowering the tailgate can be accomplished with one hand, with the linkage sharing one or more common attachment points with the detachable holding straps of the tailgate to simplify installation of the module and facilitate removal of the tailgate together with the module and the holding straps from the truck body. The accessory provides the ability to lower or raise a tailgate by a small person or non-muscular individual such as a woman so that the bed of the truck can be easily and safely loaded or unloaded, the tailgate being maintained in the down position by its own weight. The tailgate attachment prevents wrist injury, knee injury and injury to any object or person below the tailgate when the tailgate is unlocked. Raising the tailgate is assisted by the spring loading. In one embodiment, a specialized spiral wound spring is used which is compact enough to fit in the cavity between the tailgate and the truck bed, yet strong enough to provide the counterbalance force. In another embodiment a pair of scissor links are utilized with spring loading at the joint where the scissors are pivoted to counterbalance the weight of the tailgate. In a further embodiment, a lost motion device permits free opening of the tailgate but then arrests it in a safe partially opened position to prevent free fall crash no matter how the tailgate is opened. In a still further embodiment, a gas spring is used to counterbalance the tailgate, with the end of the gas spring cylinder attached to the truck bed side offset to provide clearance in one embodiment.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
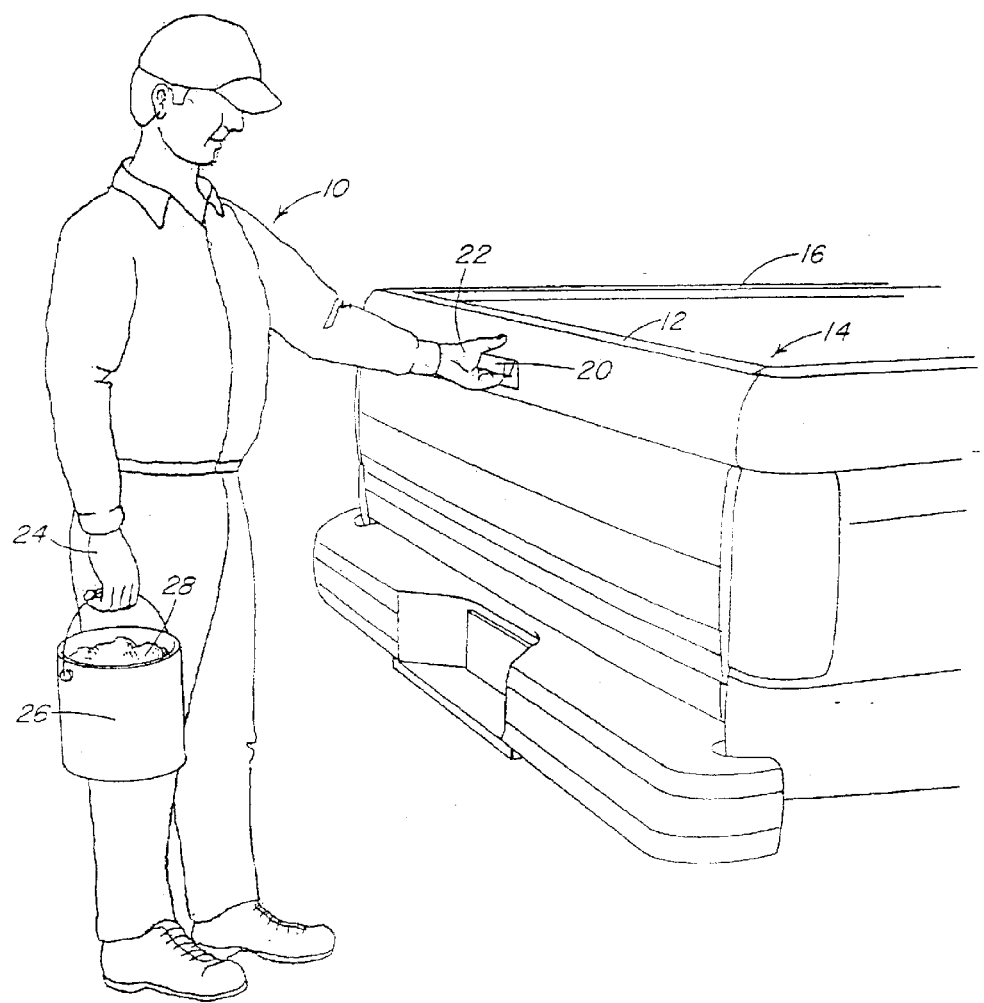
FIG. 1 is a diagrammatic illustration of an individual seeking to lower a tailgate in a one handed operation in which the other hand of the individual is otherwise occupied.

Referring now to FIG. 1 the subject device to be described is utilized to assist in an individual 10 to lower a tailgate 12 which is pivotally attached at its base to a truck bed 14 of truck 16. Here it can be seen that a handle 20 is grasped by an individual's hand 22, with the upward lifting of the handle 20 causing the tailgate to become unlatched and be free of the sides of the truck bed. It will be appreciated that in the individual's other hand, here shown at 24 a pail 26 of material 28 is being held while the individual is seeking to lower the tailgate.

Figure 2:
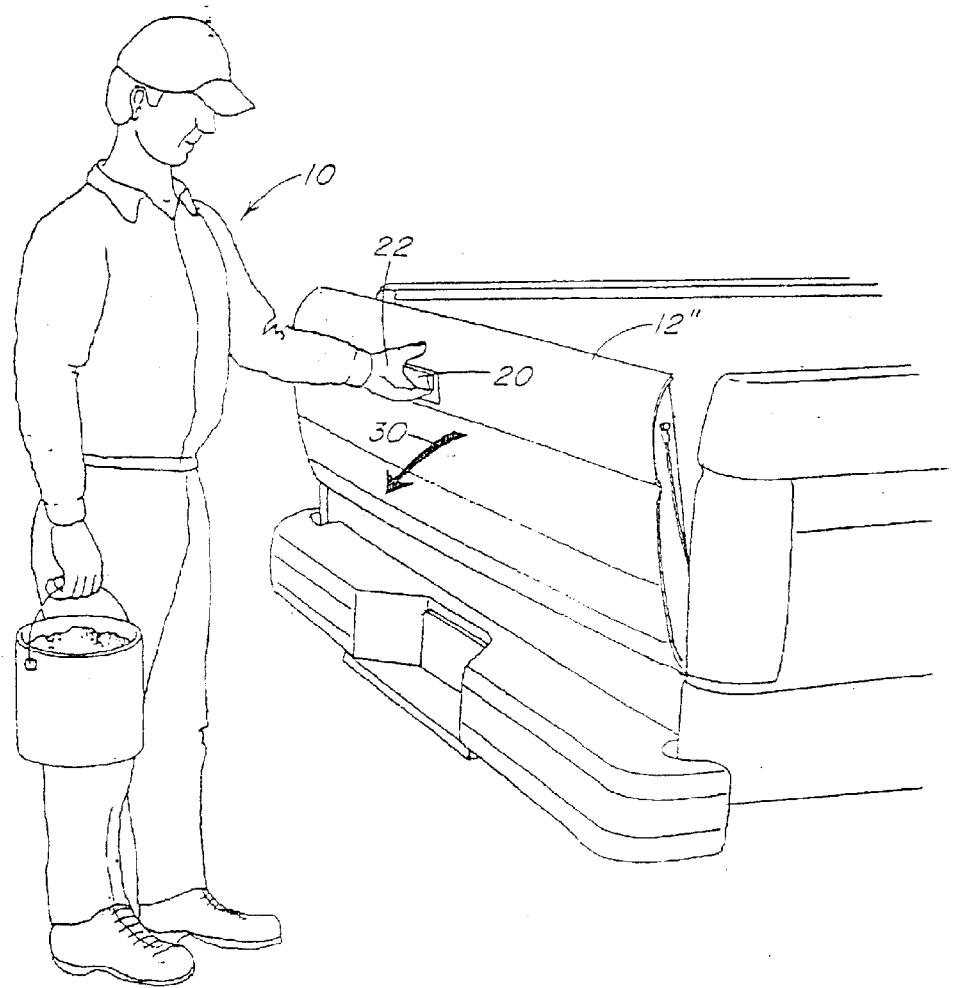
FIG. 2 is a diagrammatic illustration of the individual of FIG. 1 in which the individual has released the tailgate by pulling on the release handle in the center of the tailgate.

Referring to FIG. 2 in which like reference characters are applied between the FIGS. tailgate 12 is illustrated in position 12" such that the tailgate, may be as much as 60 pounds, moves in the direction of arrow 30 once it has been released by handle 20.

Figure 3:
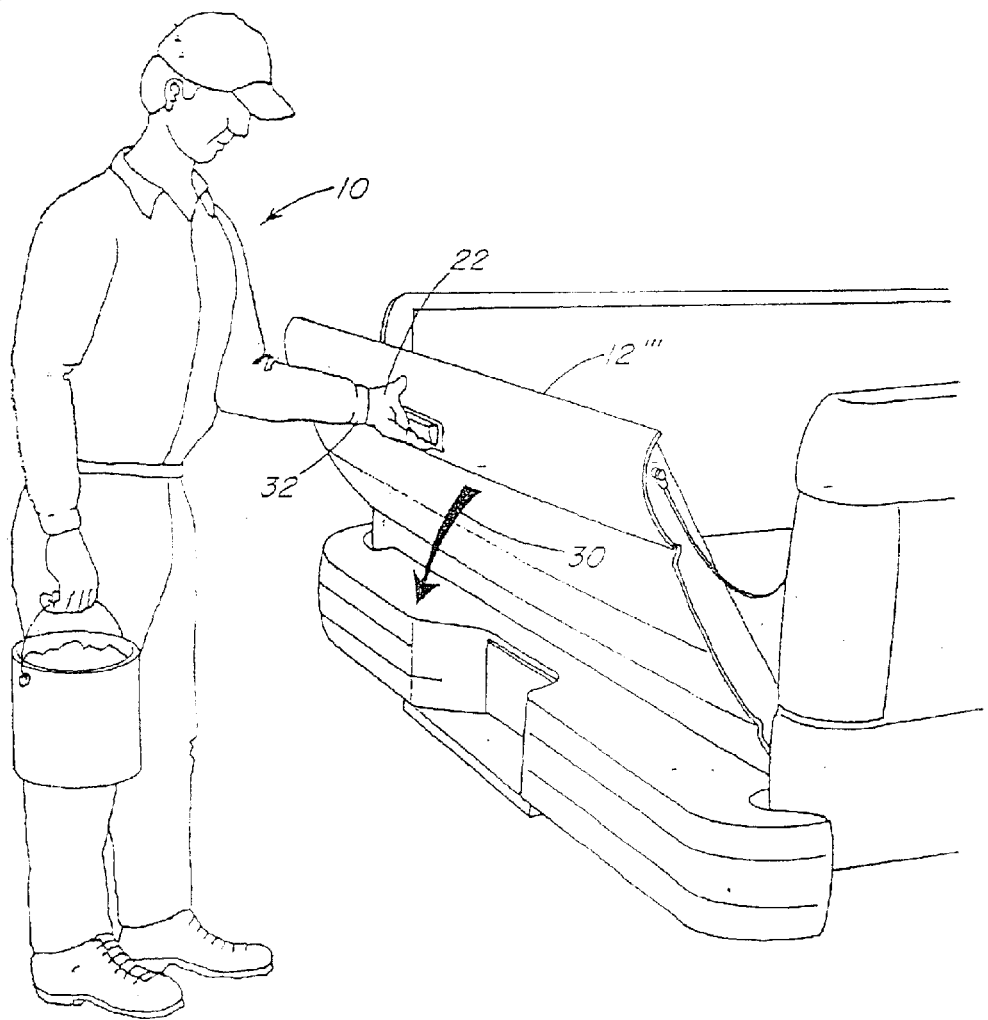
FIG. 3 is a diagrammatic illustration of the individual of FIGS. 1 and 2 illustrating the downward motion of the tailgate putting pressure on the individual's hand.

Referring to FIG. 3 as the tailgate 12" descends further as illustrated by 12"", the wrist 32 of individual 10 begins to bear the weight of the tailgate as the tailgate moves in the direction of arrow 30, with the position of hand 22 showing a backwards and downwards slant thereby putting pressure on the tendons of wrist 32. The reason for the pressure on wrist 32 is the weight of the tailgate that is now in free fall.

Figure 4:
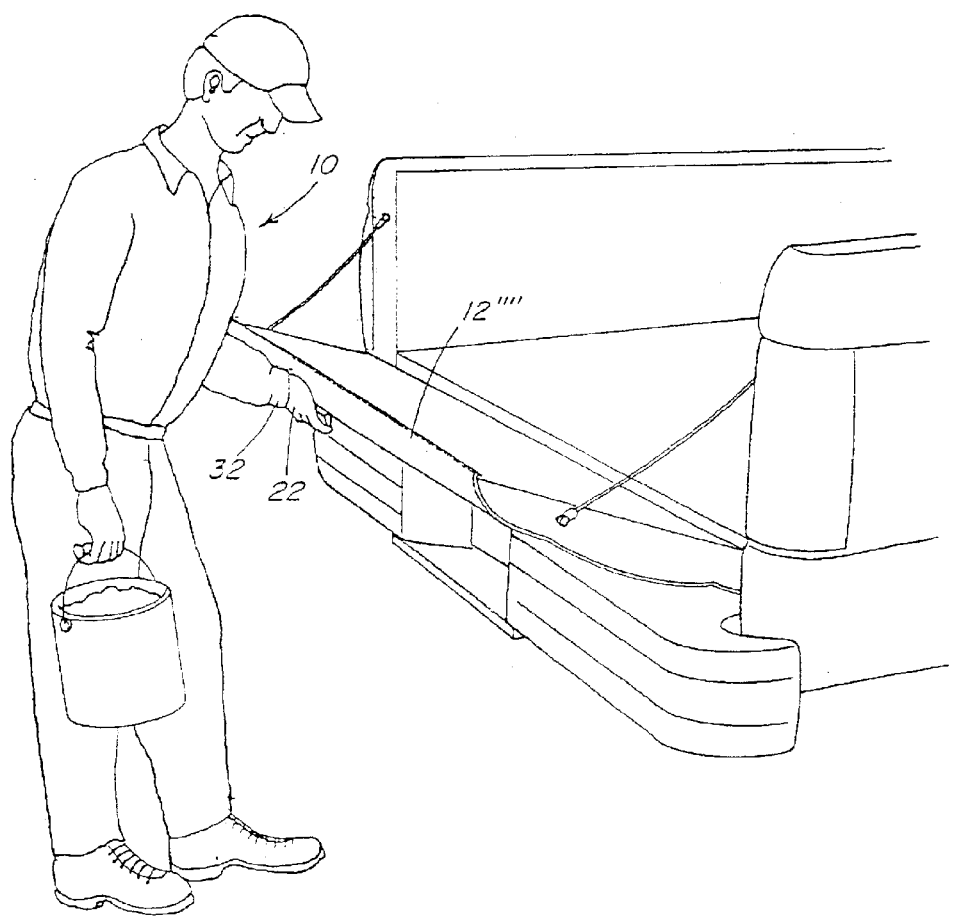
FIG. 4 is a diagrammatic illustration of the individual of FIGS. 1–3 in which the entire weight of the tailgate is born by the wrist of the individual, thereby causing the individual wrist pain.

As shown in FIG. 4, as the tailgate descends to a nearly horizontal position as illustrated 12"", hand 22 is bent backwardly causing severe pain at wrist 32 due to the full weight of the tailgate being born by the individual's hand. So intense may be the pain that the individual simply lets go of the tailgate which causes the tailgate to come crashing down.

Figure 5:
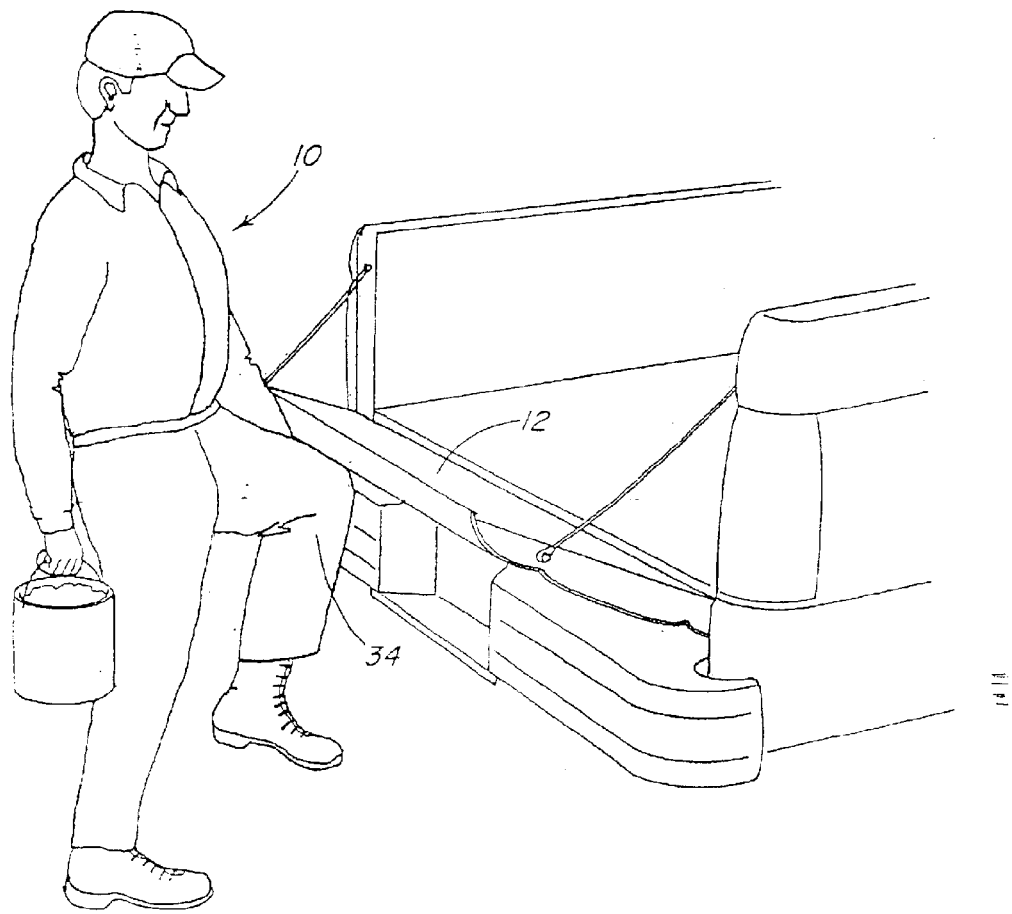
FIG. 5 is a diagrammatic illustration of the individual of FIGS. 1–4 indicating the use of the individual's knee to support the tailgate when the individual cannot support its weight single-handedly, thereby potentially causing injury to the individual's knee.

As seen in FIG. 5, individual 10 may seek to limit the free fall of tailgate 12 by raising his knee, here shown at 34 to brace a portion of the tailgate. By so doing, the individual has a chance of being injured if the tailgate falls on the knee during this process.

What will be appreciated in connection with FIGS. 1–5 is that single-handed operation of the tailgate is difficult, if not impossible, for anyone other than the strongest individual and may cause injury to a normal individual seeking to open the tailgate.

Also because of the weight of the tailgate once it is down, it is difficult to raise the tailgate single-handedly assuming the individual has something else in his other hand.

There is therefore a need, as mentioned above, to be able to counterbalance the tailgate during the lowering thereof and to also assist in the raising of the tailgate. As we will be seen, the purpose of the spring loading is to permit greater control by the individual utilizing one hand so that the descent of the tailgate can be controlled quite easily in a one handed operation.

Not only is it important to be able to control the lowering of the tailgate in a controlled fashion, it is obviously important to be able to raise the tailgate easily, since the tailgate is quite heavy. Moreover there is a need to provide a counterbalancing unit which is easily mountable to the truck and tailgate so that the unit may be offered as an after-market device which while it is easy to install, also does not preclude the removal of the tailgate from the truck bed. Usually the tailgates are lowered to a pre-determined angle and a pinion which has a flat side permits the socket into which the pinion protrudes to be slid off of the pinion. The upper end of the retaining strap is unclipped from the attachment to the side wall of the truck bed and the tailgate can then be lifted off the truck. It will be appreciated that by virtue of this arrangement the entire operation can be performed without tools. It is therefore important to be able to provide a device which stays with the tailgate and is easily removed in terms of attachment from the side wall of the truck bed so that when the tailgate is removed the counterbalancing device is likewise removed.

Figure 6:
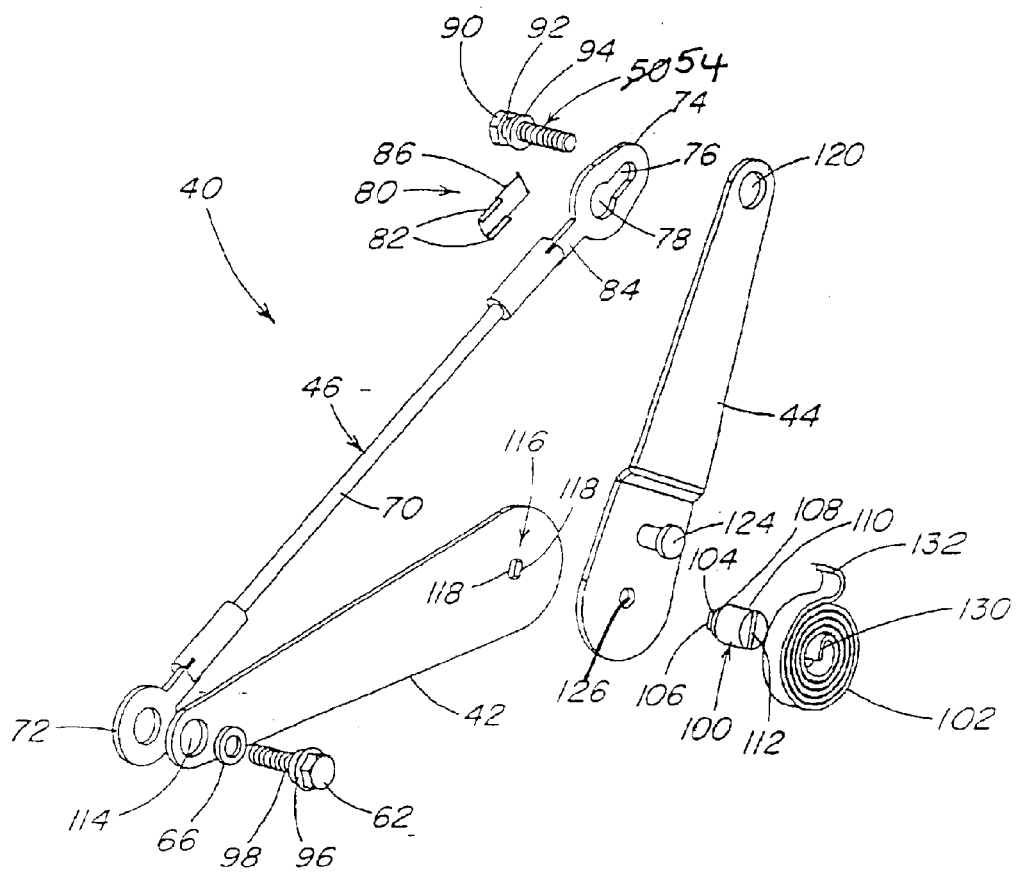
FIG. 6 is an exploded view of one embodiment of the subject invention in which scissored linkage arms are spring loaded at the pivot point of the scissored linkages through the use of a spiral wound spring having one end anchored at the pivot point of one of the linkages and its other end anchored to a point offset from the rotational center of the linkage.
Figure 7:
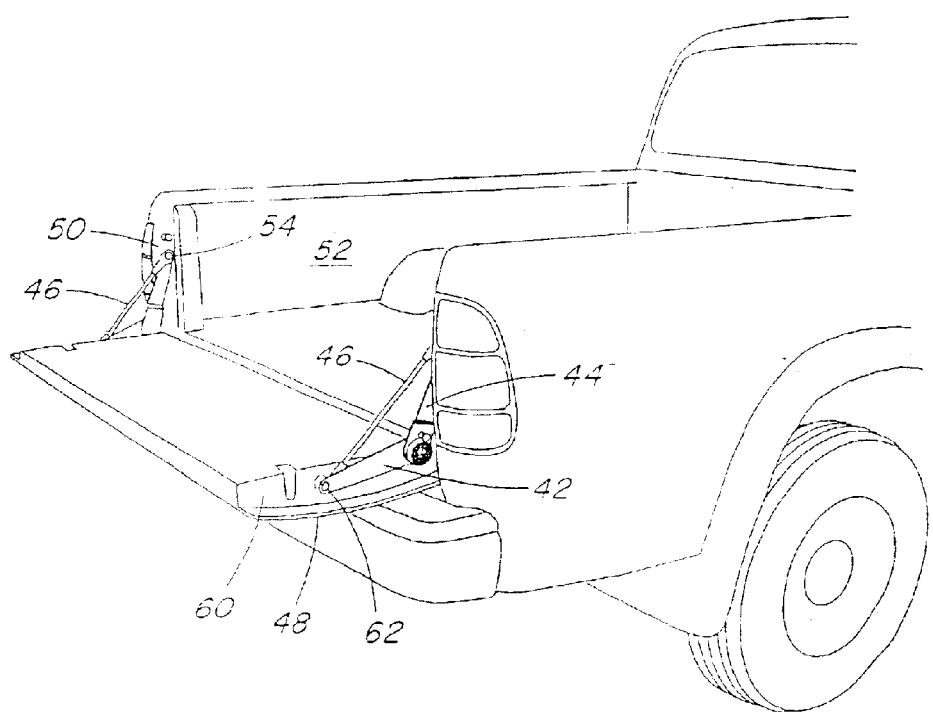
FIG. 7 is a diagrammatic illustration of the module of FIG. 6 installed in a pocket between a side of the tailgate and a side of the truck bed illustrating the position of the scissored linkages and the position of the spiral wound spring.

Referring now to FIG. 6, in one embodiment, a counterbalancing unit or module 40 includes for each side of the tailgate two spring loaded scissor linkages 42 and 44, each installed alongside a flexible brace 46 that customarily holds the tailgate in a horizontal position when the tailgate is down. The sidewalls of the tailgate are customarily spaced away from the inside faces of the truck sides and the gaps are covered up by the lips of the tailgate shown in FIG. 7 at 48. Brace 46 and scissor linkages 42 and 44 mount inside these gaps and are hidden behind the lips 48 when the tailgate is closed (not shown in this figure). The arrangement of braces 46 and scissor linkages 42 and 44 is entirely symmetrical with respect to the left and right side of the tailgate. For clarity, the following description will refer only to one side, it being understood that all features pertain to both sides.

Brace 46 is generally made out of a flexible cable. At one end, brace 46 attaches to the inside face 50 of the truck side wall 52 with a mounting bolt 54 that secures to the inside face 50 and allows that the end of brace 46 pivot freely. At the other end, brace 46 attaches to the outside wall 60 of the tailgate with a shoulder bolt 62 that secures to outside wall 60 and allows this end of brace 46 to pivot freely. Scissor linkages 42 and 44 attach to the same mounting bolt 54 as the brace 46 and, using washer 66, to the same shoulder bolt 62 as brace 46.

The conventional construction of brace 46 as supplied by the manufacturer consists of a flexible cable 70 that is terminated with a round eyelet 72 swaged to one end and a slotted eyelet 74 swaged to the other end. Slotted eyelet 74 has an elongated slot 76 with an enlarged circular opening 78. Spring clip 80 has legs 82 that fit around shank 84 and position it so that a flexible tab 86 covers circular opening 78. Mounting bolt 54 is of conventional construction as supplied by the manufacturer and has a head 90 that can fit through circular opening 78 and a groove 92 sized to receive elongated slot 76 adjacent to a boss 94. Shoulder bolt 62 is also of a conventional construction as supplied by the manufacturer and has a shoulder 98 sized to fit into round eyelet 72 and an enlarged flange 96 sized to retain round eyelet 72.

Washer 66 is supplied to pivotally attach scissor linkage 42 with shoulder bolt 62 and has an internal diameter to fit over the threaded portion of shoulder bolt 62, an outside diameter equal to that of its shoulder 98 and is wide enough to accommodate the added thickness of the lower scissor link 42.

Thus, scissor linkage consists of an upper scissor link 44 and a lower scissor link 42. They are pivotally joined by shoulder rivet 100 and are spring loaded by spiral spring 102. Shoulder rivet 100 has a round end 104 with flats 106, shoulder portion 108 and a head portion 110 with a slot 112. Lower scissor link 42 has a circular hole 114 sized to fit shoulder 98 of shoulder bolt 62 at one end and another hole 116 with flats 118 sized to firmly hold shoulder rivet 100 at the other end. Upper scissor link 44 has a hole 120 sized to fit over the boss 94 mounting bolt 54 at one end, a hole to receive the post rivet 124 and a hole 126 sized to pivot freely on shoulder portion 104 of shoulder rivet 100 at the other end. Lower scissor link 42 may be longer than upper scissor link 44 since the shoulder bolt 62 is usually located above the mounting bolt 54 when the tailgate is closed.

The combined length of scissor links 42 and 44 must be greater than the length of the brace 46 so that the included angle between the two scissor links is less than 180 degrees in the open position of the tailgate.

The spiral spring 102 fits over the head portion 108 of shoulder rivet 100 and has a flat 130 at the inside end that fits into the slot 112 of shoulder rivet 100. The outside end of the spiral spring 102 has a hook 132 that loops over a post rivet 124 of upper scissor link 44.

The number of turns of the spiral spring 102 must be chosen such as to permit the required scissor opening plus any desired preload without exceeding the elastic stress limit of the spring material to avoid a permanent set or a premature stress failure of the spring. As will be seen hereinafter, preloading is important when using the lost motion device of FIGS. 9 and 10.

The installation of the scissor linkages 42 and 44 is simple and straightforward. The truck owner lowers the tailgate, unclips slotted eyelet 74 from mounting bolt 50 and unscrews the shoulder bolt 62. He inserts the shoulder bolt 62 through hole 114 of lower scissor link 42, adds washer 66, eyelet 72 and re-installs shoulder bolt 62 into the tailgate, then slips hole 120 of the upper scissor link over the boss 94 of mounting bolt 50 and clips the slotted eyelet 74 over it. Once installed, the scissor linkage functions without any need for attention. It folds and opens in tandem with brace 46 as the tailgate is closed and opened. As lower scissor link 42 opens, it turns the shoulder rivet 100 relative to upper scissor link 44 transferring this rotation to the flat 130 of spring 102 and winding up the spring.

The torque exerted by the spring 102 is thus used to counterbalance the weight of the tailgate. The stiffness and preload of the spring can be chosen to achieve the degree of counterbalance desired.

In order to remove the tailgate from the truck, the linkage may be unclipped from the mounting bolt 50 in the conventional manner by lifting the tab 86 of the spring clip 80 and sliding the brace 46 and the upper link 44 over the head 90.

Figure 8:
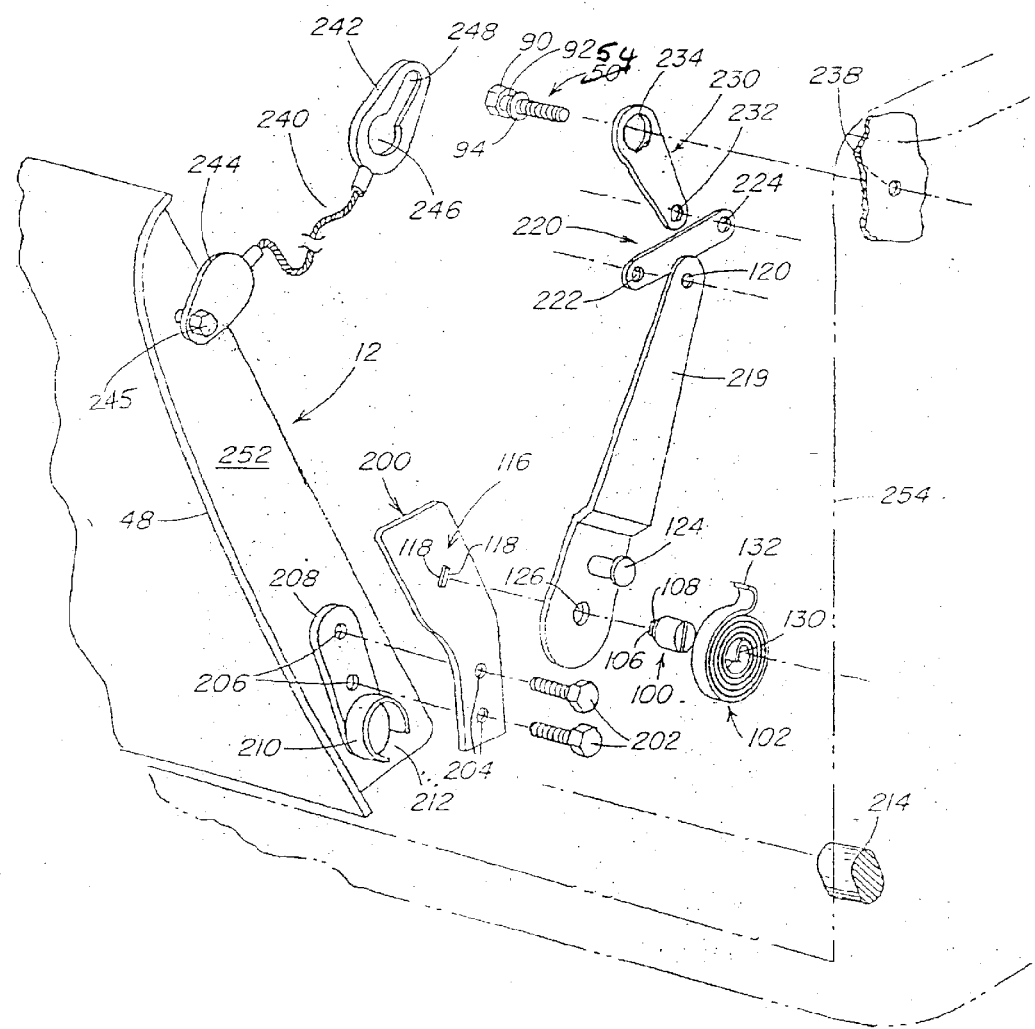
FIG. 8 is an exploded view of a second embodiment of the subject invention in which one of the linkages is secured to an end of the tailgate, with the spiral wound spring located adjacent to the pivot point of the tailgate to the truck bed and (the other linkage is attached to the truck with) a lost motion device which allows the tailgate to open slightly and then come to a stop.

In an alternative embodiment shown in FIG. 8 the scissor linkage has a link 200 fixedly attached to tailgate 12 via bolts 202 which go through holes 204 in the linkage and holes 206 in a socket bracket 208, which has a cup at its lower end which is notched as illustrated at 212. Note cup 210 is adapted to receive arbor 214, which in a preferred embodiment is oblong as illustrated.

It will be appreciated at the upper part of link 200 provides a lever arm vis a vis the point of attachment of this linkage to the tailgate, with the upper portion having a hole 116 having flat sides 118 adapted to receive the flats 106 of slotted shoulder rivet 100.

An offsetting link 220 having holes 222 and 224 therein is pivotally attached to link 219 via a rivet or bolt through hole 120. A link 230 is provided which is pivotally attached to link 220 via a bolt or rivet through hole 232. Link 230 is provided with a large bore 234 sized to slip over the head 90 and pivot on shoulder 94 of bolt 54 which is attached to the truck bed side through a hole 238. Link 230 is retained in this position by the slotted eyelet 242 of the restraining strap 240 which clips into the groove 92 of bolt 54 in the conventional manner, with enlarged hole 246 slipping over head 90 and with slot 248 residing in groove 92. Restraining strap 240 can be easily detached from the truck bed side by removal of eyelet 242 through the use of hole 246. Note that the other end of strap 240 is secured to tailgate 12 eyelet 244 and bolt 245. Links 220 and 230 allow for a lost motion between the scissor linkage 219 and the truck bed side 254 to permit the tailgate to be cracked freely before the scissor linkage exerts any force. As an added feature, the lost motion facilitates the attachment of the module to bolt 54 during installation as it offers a range of attachment positions without having to overcome the tension of the scissor links.

It will be appreciated that in this embodiment spring 102 is carried close to the base of the hinged tailgate. Note that in this embodiment one of the scissor arms is fixed to the tailgate and has a lever arm which extends up the side 252 of tailgate 12 thus to provide a relatively compact unit in which both the spring and one of the scissor arms lies between side 252 and side 254 of the truck bed shown in a dotted outline.

Thus in this embodiment the subject module is tucked into the space between the tailgate and the truck bed side in a pocket defined by lip 48 of the tailgate and side 254 of the truck bed.

Figure 9:
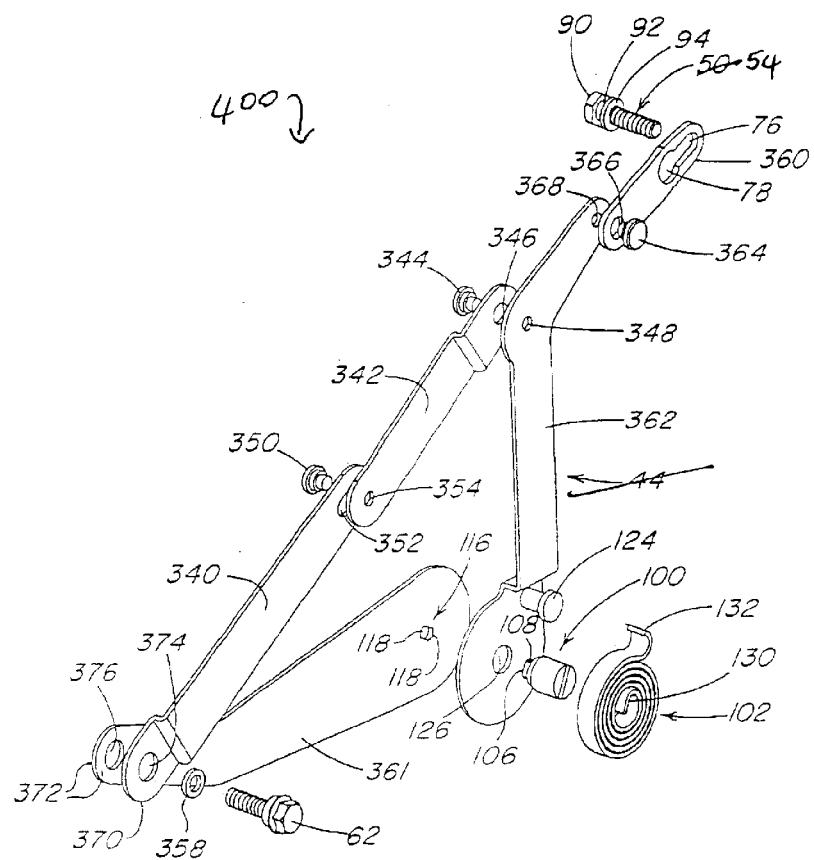
FIG. 9 is an exploded view of another embodiment of the subject invention in which the customary support cables are replaced with a set of support brackets and a lost motion device is utilized at one end of a scissor linkage system which allows the cracking or slight opening of the tailgate until it reaches a predetermined stop.

FIG. 9 shows an embodiment, which has a lost motion device consisting of a single attachment link 360 with an elongated slot 76. This embodiment shares all the features of the embodiment of FIG. 6 with the following modifications:

Brace 46 supplied as standard equipment from the factory, is omitted.

Two links 340 and 342 are added to the linkage. As seen from top to bottom, link 342 attaches pivotally to link 362 with shoulder rivet 344 through holes 346 and 348. Link 340 attaches pivotally to link 342 with shoulder rivet 350 through holes 352 and 354 at its upper end. Link 340 and link 361 attach to the tailgate at their lower ends 370 and 372, respectively, by securing bolt 62 to the tailgate through washer 358 and holes 374 and 376.

A third link 360 is attached pivotally to the end of the upper scissor link 362 with a shoulder rivet 364 through holes 336 and 368. At its free end, link 360 is fashioned in the same manner as the slotted eyelet 76 of the brace 46 with an elongated slot and an enlarged circular opening 78.

All links may be of different lengths to accommodate the truck geometry; the length of the elongated slot 76 may be extended to provide added degree of lost motion to slide over the mounting bolt 54 without spreading the scissor links 361 and 362 when the tailgate is partially opened as shown in FIGS. 10A–10D. The combined length of links 340, 342, segment 348–126 of link 362 and link 361 equals that of former brace 46. The combined length of links 362 and 361 must be greater than the combined length of links 340 and 342 so that the included angle between the two scissor links 362 and 361 is less than 180 degrees in the open position of the tailgate.

The principle of the linkage of the FIG. 9 embodiment is the same as that of the FIG. 6 embodiment. The differences arising from substituting pivotal links 340 and 342 flexible brace 46 are self-evident. There is a minor simplification in the installation process since the spiral spring 102 biases the link 360 away from the circular opening 78 and the spring clip 80 (FIG. 6) therefore becomes redundant.

The addition of link 360 serves as a lost motion device. By pivoting and sliding slot 76 over mounting bolt 54 as shown in FIGS. 10A–10D, the tailgate can be opened partially without spreading the scissor links 36 l and 362 at all. This feature may be desirable as it allows some play to actuate the tailgate handle and crack the tailgate open without having to overcome any preload exerted by the scissor linkage. However, in order to maintain the tailgate cracked open, spring 102 is preloaded to prevent the tailgate from lowering past the point dictated by slot 76 until the tailgate is further urged downward to open it. The restoral force of the spring is such as to maintain the tailgate at for instance 12 degrees, given the particular weight of the tailgate.

Figure 10A:
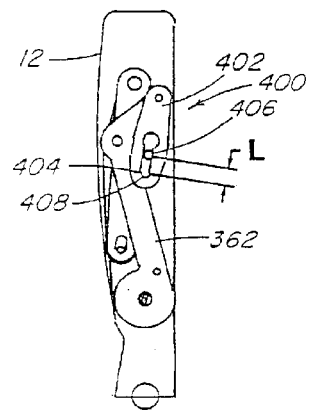
FIG. 10A is a diagrammatic illustration of the lost motion scissor linkage system of FIG. 9 folded completely in the fully up position of the tailgate.
Figure 10B:
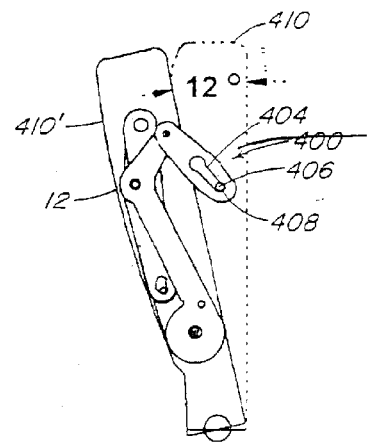
FIG. 10B is a diagrammatic illustration of the lost motion device of FIG. 10A at the end of its travel allowing the tailgate to be freely opened 12 degrees initially.

In general and referring now to FIGS. 10A–10D, it will be appreciated that what is described is a lost motion device 400 which permits cracking tailgate 12 as illustrated in FIG. 10B by an amount, for instance, 12 degrees, prior to the time that the counterbalancing apparatus takes effect. In this case, as described hereinbefore, a slotted linkage 402 is provided with a slot 404 that accommodates an attachment bolt 406 therethrough.

It will be appreciated that the lost motion is between, bolt 406 and the end of slot 404, here illustrated at 408, in which a travel length L is that which provides for the lost motion.

As can be seen in FIG. 10B, the tailgate moves from its dotted position at 410 to the position illustrated at 410' in which bolt 406 is now at the end of its travel at the end 408 of slot 404. It is only at this time that the counterbalancing provided by the subject module comes into play. Because of spring preloading, when at the end 408 of slot 404, lost motion device 400 provides enough restoring force to balance the weight of the tailgate at the preselected angle. This means that with hands off the gate simply stays at 12 degrees.

Figure 10C:
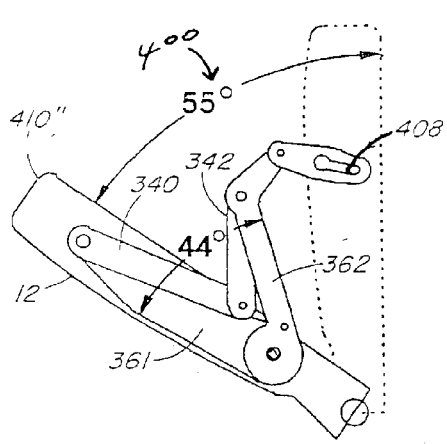
FIG. 10C is a diagrammatic illustration of the tailgates of FIGS. 10A and 10B illustrating the utilization of the spring loaded module to counterbalance the weight of the tailgate once the tailgate is moved past 12 degrees.
Figure 10D:
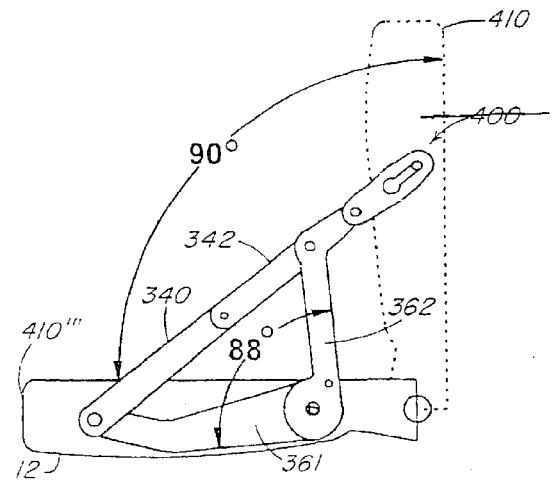
FIG. 10D is a diagrammatic illustration of the tailgate assembly of FIGS. 10A, 10B and 10C illustrating the position of the tailgate when it is down in a horizontal position.

Referring to FIG. 10C as the tailgate 12 is manually lowered as illustrated at 410". For an opening of 55 degrees there is a 44 degree angle between link 361 and link 362 as illustrated. Here the counterbalancing of lost motion device 400 assists in the controlled one-handed lowering of the tailgate.

Finally as illustrated in 10D tailgate 12 is fully lowered to a horizontal position as illustrated at 410''', a full 90 degrees from its upright position at 410, with links 340 and 342 fully extended to limit the downward travel of the tailgate. The angle between link 361 and link 362 is 88 degrees as illustrated.

It is noted that the lost motion device of FIG. 9 works equally well for the FIGS. 6 and 8 embodiments to provide for a convenient cracking of the tailgate, with the tailgate being maintained in a safe, partially open position by preloading of the spring. To lower the tailgate, the operator pulls the tailgate down gently with one hand until the weight of the tailgate exceeds the counterbalancing moment of the spring and the tailgate comes to rest in the fully open position.

Figure 11B:
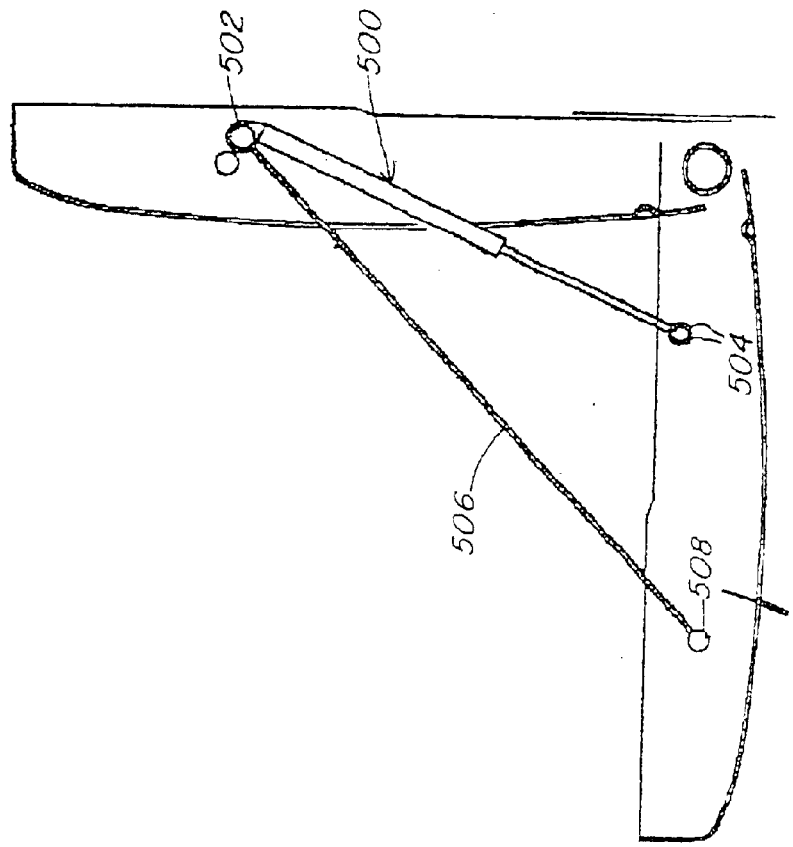
FIG. 11B is a diagrammatic illustration of the gas spring embodiment of FIG. 11A in which the gas spring provides the counterbalancing forces to permit the lowering of the tailgate.
Figure 11A:
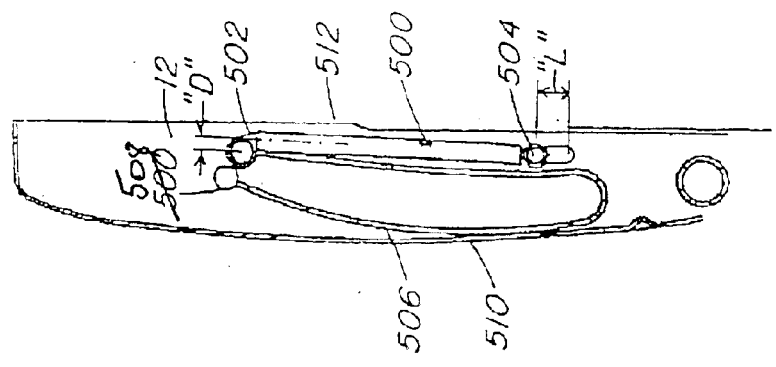
FIG. 11A is a diagrammatic illustration of the utilization of a gas spring in which the gas spring cylinder is contained within a pocket between the tailgate and the trunk bed side when the tailgate is in the up position.

Referring now to FIGS. 11A and 11B. what is illustrated is a gas spring counter balance in which a gas spring 500 is attached at one end 502 to the side of the truck bed and at another end 504 to tailgate 12. A safety retaining strap 506 restrains the tailgate in its down position as illustrated in FIG. 11B, with the strap 506 being attached to the truck bed side at attachment hole 502 and also to the tailgate at 508. An attachment hole may be offset by a distance D to the axis of the gas cylinder so as no to interfere with the safety retaining strap 506.

As can been seen in FIG. 11A, the entire apparatus including the gas spring and the strap is contained within the lip 510 of tailgate 12 with strap 506 being shown in its folded condition in the pocket provided between the lip 510 of the tailgate and the top surface 512 of tailgate 12.

As will be appreciated, the spring constant of the counterbalance mechanism is such as to be insufficient to return the tailgate to its upright position, with the counterbalance only balancing a portion of the weight of the tailgate. This assures that the tailgate when lowered remains in its down position.

The attachment hole for ends 502 or 504 may be fashioned as an elongated slot so as to permit several degrees of lost motion before the gas spring is tensioned. Here the attachment hole associated with end 504 is shown elongated by distance L. In combination with the right amount of pre-tensioning of the gas spring, this feature will arrest the tailgate in a partially open position. As the tailgate is lowered by hand beyond this position, the weight of the tailgate overcomes the counterbalance force of the spring so that the tailgate remains lowered in its down position. As an added feature, the elongated slot facilitates attachment of the gas spring during installation, as it offers a range of attachment positions.

The advantage of the gas spring is that when the tailgate is unlocked it will not crash down due to the fluid damping in the gas spring. Rather the tailgate descends at a controlled rate regardless of the individual touching the tailgate. Its advantages are the same as the one-handed control of the spiral spring embodiment. However, the operation of the lowering of the tailgate can be accomplished in a completely hands off mode due to the damping action of the gas spring.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

Figure 12:
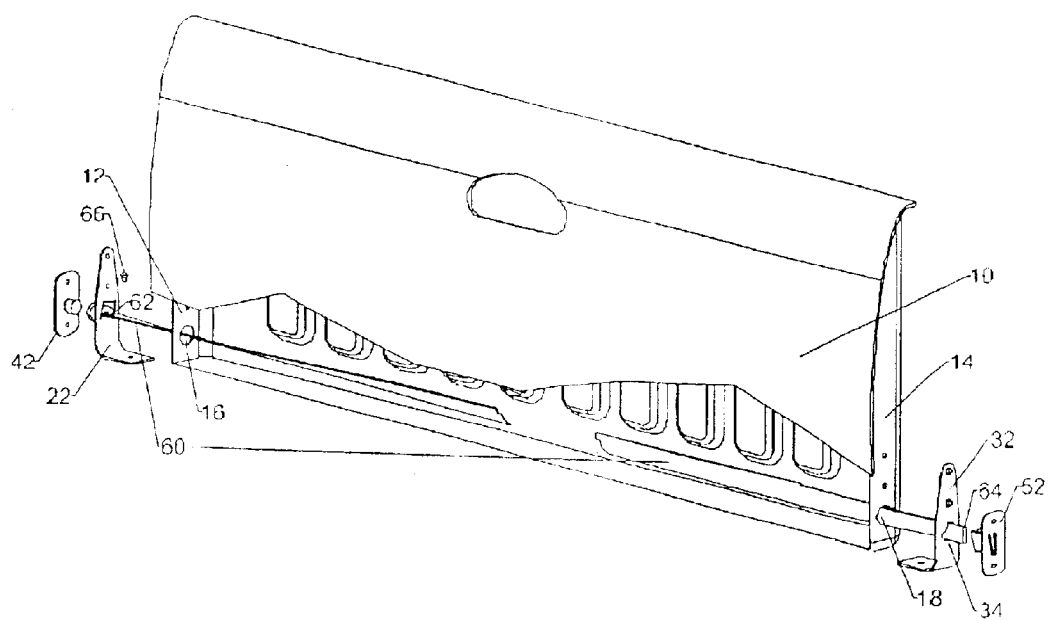
FIG. 12 is an isometric exploded view of a tailgate with the outside panel partially cut away to show the layout of the working parts of the invention.

The layout of the working parts of the invention is shown in FIG. 12 in an exploded view.

A torsion bar 60 attaches rigidly to the driver's side hinge bracket 22 with a fastener 66. Hinge bracket 22 attaches to the side panel 12 of the tailgate. Side panel 12 has an aperture 16 through which the torsion bar 60 passes into the tailgate 10 running along the whole width of the tailgate 10 and protrudes through aperture 18 on the other side panel 14 and through an aperture 34 of the passenger's side mounting bracket 32.

Figure 15:
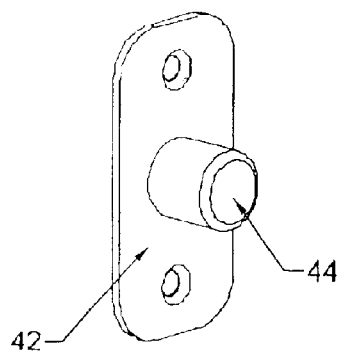

The tailgate hinges on support brackets 42 and 52 which attach rigidly to the sides of the truck (not shown). On the driver's side the support bracket (see FIG. 15) has a cylindrical boss 44 which mates with the hollow cup 25 on the outside face of the hinge bracket 22 (see FIG. 13). On the passenger's side the support bracket 52 has a slot 54 which mates with the protruding end 64 of the torsion bar 60.

Figure 13:
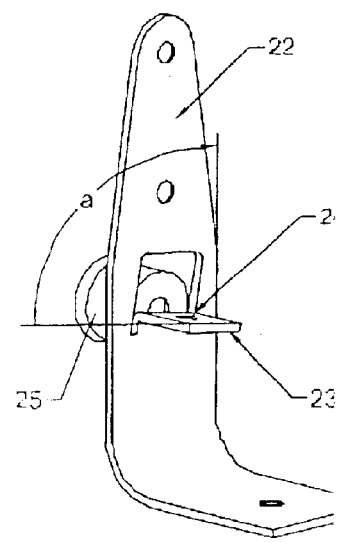
FIGS. 13, 14, 15 and 16 are enlarged isometric views to show the construction of the various working parts in detail; and, FIG. 17 is a graphical representation of the forces needed to raise and lower the tailgate with and without the invention as a function of the opening angle of the tailgate.
Figure 14:
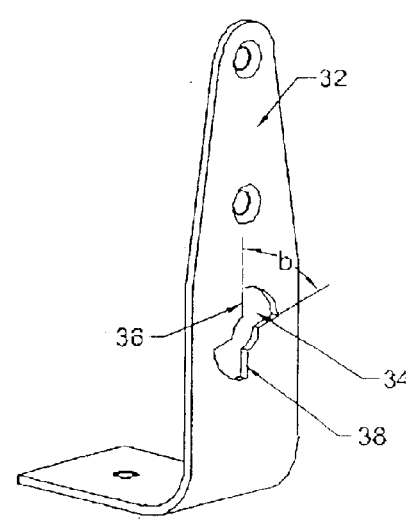

FIG. 13 also show stud 23 with a hole 24 for rigidly mounting the driver's side end of the torsion bar 60 to the hinge bracket 22. Stud 23 is inclined by angle "a" measured from the vertical. The other end of the torsion bar 60 passes through the aperture 34 of the passenger's side hinge bracket 32. Aperture 34 has a pair of stops 36 and 38 which restrain the rotation of the torsion bar 60 in the vertical position when rotated counterclockwise (as seen from the passenger's side), but permits clockwise rotation by the angle "b".

Figure 16:
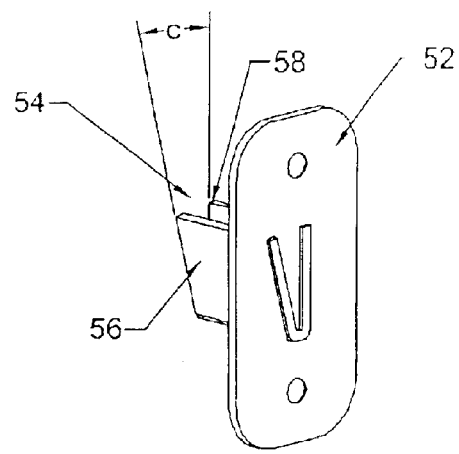

FIG. 16 shows the slot 54 in the passenger's side support bracket 52. The slot 54 has two flat sides 56 and 58 and is closed at the bottom to carry the torsion bar end 64 protruding from the hinge bracket 32. Flat sides 56 and 58 are spread at an angle "c" of usually 15 degrees to afford lost motion travel of the torsion bar within that angle.

The tailgate 10 installs in the conventional fashion by first sliding the cup 25 over the stud 42 on the driver's side and then lowering the protruding end 66 of the torsion bar 60 into the slot 54 on the passenger's side while holding the tailgate at an inclination of approx. 15 degrees. Once installed in the 15 degree position the tailgate can be closed freely due to the lost motion afforded by the sloping sides 56 and 58 of the slot 54. The torsion bar 60 is mounted at angle "a" on the diver's side but restrained in the vertical position by stops 36 and 38 so that the torsion bar 60 is twisted, or pre-tensioned by the angle "a". When the tailgate is opened it can travel freely by amount of angle "c". To open the tailgate beyond that point requires that the torsion bar is twisted or tensioned. The initial pretension if the torsion bar due to the twist of angle "a" can be sized such the turning moment of the torsion bar exceeds the opening moment of the tailgate due to its weight at the angle "a" position and the tailgate is thus balanced in that "safety" position. To open the tailgate further then requires a gentle pull to overcome the tension of the torsion bar. The opening moment of the tailgate 10 increases in a sinusoidal manner as a function of the opening angle while the retaining moment of the torsion bar 60 increases only linearly. A point can thus be reached as the tailgate 10 is opened further at which the weight of the tailgate 10 overcomes the restrain of the torsion bar 60 and the tailgate falls of its own accord as long as the torsion bar 60 is sized correctly.

Figure 17:
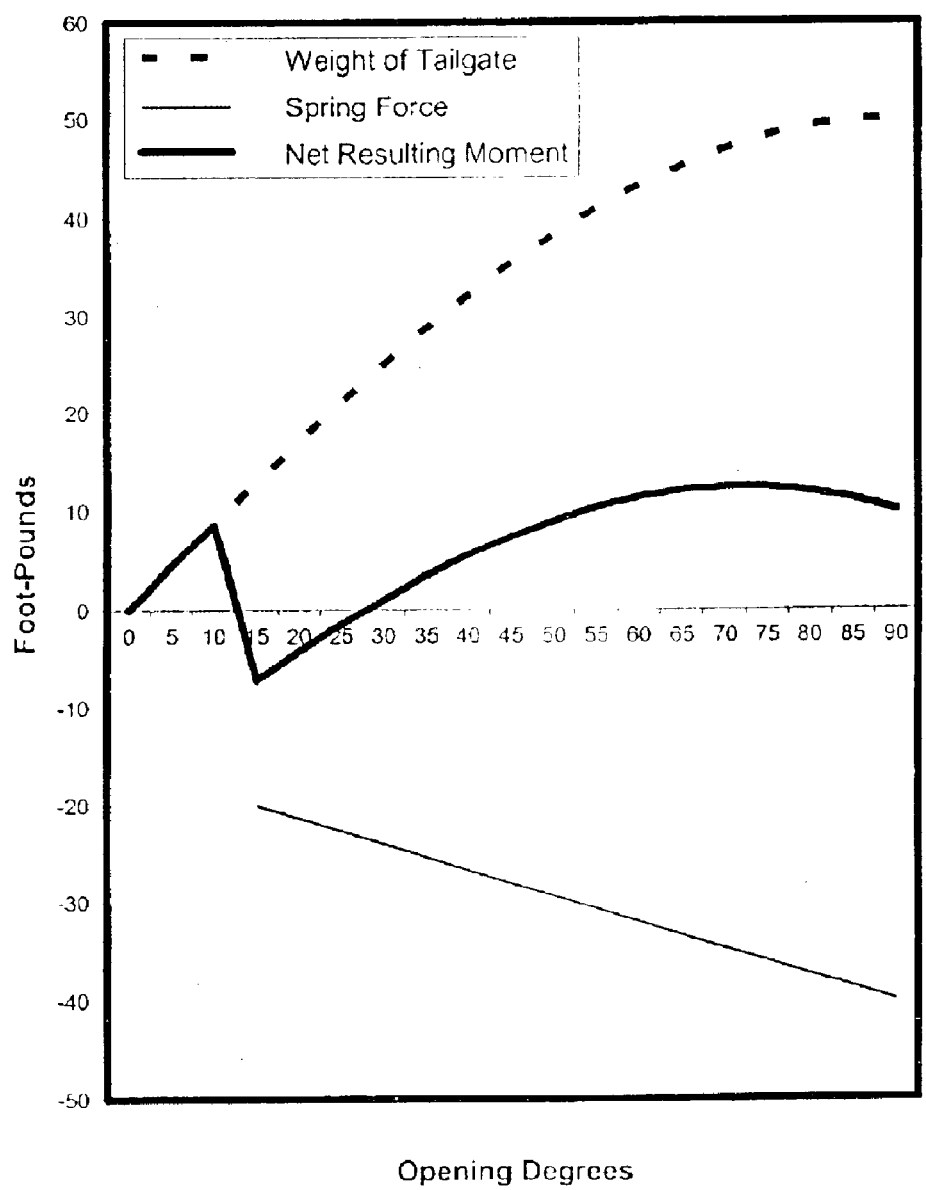

This relationship is illustrated in FIG. 17 in a graphical fashion. The opening moment due to the weight of the tailgate is shown by a dotted line. For a full sized pickup truck with a tailgate of 50 lbs the opening moment at 15 degrees is approx. 12 ft-lbs and at 90 degrees, or the fully open position, it is about 50 ft-lbs. To achieve the desired behavior the angle "a" should be approx 60 degrees to pretension the torsion bar by that amount, and the ultimate stiffness of the torsion bar should be approx 40 ft-lbs when the tailgate is fully opened and the torsion bar twisted an additional 75 degrees. The restoring spring force of the torsion bar is shown by a negative straight line that starts at $-60/(60+75) \times 40 = -18$ ft-lbs at 15 degrees and reaches $-40$ ft-lbs at 90 degrees. The net resulting moment acting on the tailgate as assisted by the torsion bar is shown by a heavy solid line.

The torsion bar assisted tailgate moves freely up to 15 degrees with a maximum closing force of approx. 8 ft-lbs. At 15 degrees the pretension of the torsion bar exceeds the weight of the tailgate as shown by the force reversal from +8 ft-lbs to −5 ft-lbs at that point. To open the tailgate beyond that point requires a pull of approx. 5 ft-lbs. The required pull diminishes as the tailgate is opened further and reaches 0 at approx 25 degrees. Beyond this point the opening moment of the tailgate exceeds the restraining moment of the torsion bar and the tailgate falls of its own accord.

The impact of the tailgate as it opens fully is however greatly reduced as it falls through an arc of only 65 degrees (vs. 90 degrees of the unassisted tailgate) and the gravitational pull is absorbed by twisting the torsion bar.

FIG. 17 also shows the reduction in effort to close the tailgate. Comparing the dotted line that represents the unassisted tailgate and the heavy solid line that represents the net resulting moment of the torsion bar assisted tailgate, it can be seen that the pull required is reduced from 50 to approx. 10 ft-lbs, a reduction of over 75%.

What is claimed is:

1. Apparatus for assisting safe manual raising and lowering of a tailgate pivotally attached to a bed of a truck, said tailgate having a lip and said bed having a side, comprising:
    a spring attached to said tailgate and said bed for providing a counterbalancing force operating against the weight of said tailgate, said spring including a pair of scissored linkages pivoted one to the other, with said spring attached to said linkages so as to bias said linkage one towards the other.

2. The apparatus of claim 1, wherein the restoring force of said spring is less than that exerted by said tailgate when in a level down position, whereby once said tailgate is down it stays down.

3. The apparatus of claim 1, wherein said spring is a spiral wound spring.

4. The apparatus of claim 1, wherein said spring is a gas spring.

5. The apparatus of claim 1, wherein said tailgate is detachable from said truck bed and wherein said spring is detachable from said truck bed.

6. The apparatus of claim 1, and further including a lost motion device connected between said truck bed and said spring to permit partial opening of said tailgate prior to when the counterbalancing action of said spring comes into play.

7. The apparatus of claim 1, and further including a safety device for limiting the downward movement of said tailgate to a level position, and wherein said spring is attached to said truck bed at the attachment point for said safety device.

8. The apparatus of claim 7, wherein said safety device is a linkage.

9. The apparatus of claim 1, wherein one of said scissored linkages is fixedly attached to said tailgate.

10. The apparatus of claim 1, wherein side scissored linkages are pivotally attached respectively to said tailgate and said truck bed.

11. The apparatus of claim 10, wherein the linkage attached to said truck bed includes an aperture and wherein said truck bed includes a bolt over which said aperture is intended to be slipped for the attachment of said last-mentioned linkage to said truck bed.

12. Apparatus for assisting safe manual raising and lowering of a tailgate pivotally attached to a bed of a truck, comprising:
    a spring attached to said tailgate and said bed for providing a counterbalancing force operating against the weight of said tailgate; and
    a lost motion device connected between said bed and said spring to permit partial opening of said tailgate prior to when the counterbalancing action of said spring comes into play.

13. Apparatus for assisting safe manual raising and lowering of a tailgate pivotally attached to a bed of a truck, comprising:
    a spring attached to said tailgate and said bed for providing a counterbalancing force operating against the weight of said tailgate; and
    a safety device for limiting the downward movement of said tailgate to a level position, and wherein said spring is attached to said bed at the attachment point for said safety device.

14. An accessory for counterbalancing a tailgate pivotally mounted to a truck bed, comprising:
    a spring mounted between said tailgate and said truck bed for spring biasing said tailgate in an upright position such that a restoring force is applied to said tailgate to permit one-handed lowering of said tailgate; and
    a lost motion device mounted between said spring and said truck bed for permitting the partial opening of said tailgate prior to the application of said restoring force by said spring.

15. An apparatus for assisting the lowering and raising of a tailgate pivotally attached to a bed of a truck comprising:
    a torsion bar attached to the tailgate and the bed for providing a counterbalancing force against weight of the tailgate; and
    a lost motion mechanism for permitting easy partial opening of the tailgate.

16. The apparatus of claim 15 in which the torsion bar is pre-tensioned.

17. The apparatus of claim 16 in which the torsion bar is pre-tensioned to a level that provides enough force to prevent the tailgate from dropping beyond said partial opening.

18. The apparatus of claim 17 in which the torsion bar has a restoring force that is less than the weight of the tailgate when in a level position so that the tailgate can remain in said level position when down.

19. The apparatus of claim 15 in which said apparatus does not interfere with removal of the tailgate from the bed.

20. The apparatus of claim 15 in which the lost motion mechanism comprises a support arrangement on the bed configured for restraining an end of the torsion bar in a manner that provides an angle of lost motion travel of the torsion bar.

21. The apparatus of claim 20 in which the lost motion mechanism further comprises an arrangement on the tailgate which restrains rotation of the torsion bar in one direction but permits rotation in an angle in an opposite direction.

22. An apparatus for assisting the lowering and raising of a tailgate pivotally attached to a bed of a truck comprising:
    a pre-tensioned torsion bar attached to the tailgate and the bed for providing a counterbalancing force against weight of the tailgate; and
    a lost motion mechanism for permitting easy partial opening of the tailgate, the lost motion mechanism comprising a support arrangement on the bed configured for restraining an end of the torsion bar in a manner that provides an angle of lost motion travel of the torsion bar, the torsion bar being pre-tensioned to a level that provides enough force to prevent the tailgate from dropping beyond said partial opening.

23. A method for assisting the lowering and raising of a tailgate pivotally attached to a bed of a truck comprising:
    attaching a torsion bar to the tailgate and the bed for providing a counterbalancing force against weight of the tailgate; and permitting easy partial opening of the tailgate with a lost motion mechanism.

24. The method of claim 23 further comprising pre-tensioning the torsion bar.

25. The method of claim 24 further comprising pre-tensioning the torsion bar to a level that provides enough force to prevent the tailgate from dropping beyond said partial opening.

26. The method of claim 25 further comprising providing the torsion bar with a restoring force that is less than the weight of the tailgate when in a level position so that the tailgate can remain in said level position when down.

27. The method of claim 24 further comprising providing the lost motion mechanism with a support arrangement on the bed configured for restraining an end of the torsion bar in a manner that provides an angle of lost motion travel of the torsion bar.

28. The method of claim 27 further comprising providing the lost motion mechanism with an arrangement on the tailgate which restrains rotation of the torsion bar in one direction but permits rotation in an angle in an opposite direction.

29. A method of forming an apparatus for assisting the lowering and raising of a tailgate pivotally attached to a bed of a truck comprising:

attaching a torsion bar to the tailgate and the bed for providing a counterbalancing force against weight of the tailgate; and providing a lost motion mechanism for permitting easy partial opening of the tailgate.

* * * * *

UNITED STATES PATENT AND TRADEMARK OFFICE
CERTIFICATE OF CORRECTION

PATENT NO. : 6,857,679 B2  
DATED : February 22, 2005  
INVENTOR(S) : Dimiter S. Zagoroff It is certified that error appears in the above-identified patent and that said Letters Patent is hereby corrected as shown below:

<u>Title page,</u>  
Items [12] and [76], correct the surname of the inventor to read -- Zagoroff --.

Signed and Sealed this

Twenty-fourth Day of May, 2005

JON W. DUDAS  
*Director of the United States Patent and Trademark Office*